United States Patent
Sun et al.

(10) Patent No.: US 10,563,809 B2
(45) Date of Patent: Feb. 18, 2020

(54) LOOSE LINING STRUCTURE BASED ON A TANTALUM PLATE AND A STEEL CLAD PLATE AND MANUFACTURING METHOD THEREOF

(71) Applicant: Xi'an United Pressure Vessel Co., Ltd., Xi'an, Shaanxi (CN)

(72) Inventors: Wancang Sun, Shaanxi (CN); Jianlin Ye, Shaanxi (CN); Cheng Zhang, Shaanxi (CN); Xuming He, Shaanxi (CN); Minzhe Yuan, Shaanxi (CN); Bin Dong, Shaanxi (CN); Kaifei Xia, Shaanxi (CN); Zhongrong Lei, Shaanxi (CN); Dalai Xi, Shaanxi (CN); Bin Su, Shaanxi (CN); Lu Tong, Shaanxi (CN); Bin Zhao, Shaanxi (CN); Peng Wang, Shaanxi (CN)

(73) Assignee: Xi'an United Pressure Vessel Co., Ltd., Xi'an, Shaanxi (CN)

( * ) Notice: Subject to any disclaimer, the term of this patent is extended or adjusted under 35 U.S.C. 154(b) by 245 days.

(21) Appl. No.: 15/580,176

(22) PCT Filed: Jun. 25, 2016

(86) PCT No.: PCT/CN2016/087169
§ 371 (c)(1),
(2) Date: Dec. 6, 2017

(87) PCT Pub. No.: WO2017/219374
PCT Pub. Date: Dec. 28, 2017

(65) Prior Publication Data
US 2019/0242517 A1 Aug. 8, 2019

(51) Int. Cl.
*F16L 58/08* (2006.01)
*B32B 15/01* (2006.01)
*F16L 9/04* (2006.01)

(52) U.S. Cl.
CPC .............. *F16L 58/08* (2013.01); *B32B 15/01* (2013.01); *F16L 9/04* (2013.01)

(58) Field of Classification Search
CPC ..... F28F 9/18; F16L 58/08; F16L 9/04; B32B 15/01
(Continued)

(56) References Cited

U.S. PATENT DOCUMENTS 4,140,172 A * 2/1979 Corey .................. B01J 19/0073
165/133
5,027,891 A * 7/1991 Fulford ..................... C01F 7/06
165/104.14
(Continued)

FOREIGN PATENT DOCUMENTS

CN 201811636 U * 4/2011
CN 204757790 U * 11/2015
CN 205288373 U * 6/2016

*Primary Examiner* — Patrick F Brinson

(57) ABSTRACT

A loose lining structure based on a tantalum plate and a steel clad plate is disclosed, which includes a plate cladding base formed by the steel clad plate and the tantalum plate covered on the steel clad plate. The steel clad plate is formed by a steel layer and a cladding layer laid on the steel layer, a periphery of the tantalum plate is fixed with the cladding layer through welding, a medium circulation pipe and/or a reinforcement fastening are/is set on the plate cladding base, the medium circulation pipe includes a tantalum liner tube, the reinforcement fastening is a tantalum plug. Also, a manufacturing method of the loose lining structure based on the tantalum plate and the steel clad plate is disclosed, which includes steps of (S1) fixing through welding; (S2) processing installing holes; and (S3) installing components.

13 Claims, 5 Drawing Sheets

(58) Field of Classification Search
USPC .................. 138/141–143; 165/134.1, 178
See application file for complete search history.

(56) References Cited

U.S. PATENT DOCUMENTS

| | | | |
|---|---|---|---|
| 6,032,696 A * | 3/2000 | Quintana | F16L 55/1657 137/315.01 |
| 8,973,810 B2 * | 3/2015 | Sutherlin | B01J 19/02 228/193 |
| 2007/0017658 A1 * | 1/2007 | Lehman | H05K 7/20254 165/80.4 |
| 2008/0093064 A1 * | 4/2008 | Gianazza | F16L 13/0236 165/180 |

* cited by examiner

US 10,563,809 B2

LOOSE LINING STRUCTURE BASED ON A TANTALUM PLATE AND A STEEL CLAD PLATE AND MANUFACTURING METHOD THEREOF

CROSS REFERENCE OF RELATED APPLICATION

This is a U.S. National Stage under 35 U.S.C 371 of the International Application PCT/CN2016/087169, filed Jun. 25, 2016.

BACKGROUND OF THE PRESENT INVENTION

Field of Invention

The present invention relates to the technical field of chemical equipment processing, and more particularly to a loose lining structure based on a tantalum plate and a steel clad plate and a manufacturing method thereof.

Description of Related Arts

Chemical equipment refers to machineries whose main components are still or move little, such as various containers (including tanks, cans and kettles), ordinary kilns, towers, reactors, heat exchangers, ordinary dryers, evaporators, reaction furnaces, electrolyser, crystallization equipment, mass transfer equipment, adsorption equipment, fluidization equipment, ordinary separation equipment and ion exchange equipment. For chemical equipment that stores or transports corrosive media, its high pressure resistance, corrosion resistance and sealing performance are critical, such as corrosion-resistant tube sheets for heat exchangers, outer covers in containers and flanges in medium conveying pipes.

In recent years, with the continuous development of technology, requirements for chemical corrosive resistance are also increasing, so tantalum as the most ideal corrosion-resistant metal material has more and more market demands. Metal tantalum and its alloys have high density, high melting point and excellent corrosive resistance, but also have good high temperature strength, good processing and other characteristics, so they are widely used in electronics, chemical industry, aerospace, weapons and other fields. In the field of chemical industry, tantalum is a very good corrosion-resistant material, and especially in some strong corrosive conditions (such as high temperature dilute sulfuric acid, hydrochloric acid, and nitric acid), tantalum materials have good corrosive resistance and stability which are unable to be replaced by other metals.

However, a lot of characteristics of tantalum materials restrict the promotion and application thereof, which are mainly in following three aspects: firstly, the density is large and cost is high, the price of tantalum is about 40 times that of titanium and 7 times to 8 times that of zirconium, so that few people use pure tantalum to manufacture the chemical equipment; secondly, tantalum materials are refractory materials, whose melting point reaches 2996° C., which is greatly different from general metal materials and difficult to be fusion welded with other metals; thirdly, the chemical equipment, which can be made from tantalum, is generally adapted for a strong corrosive medium environment, which easily leads to security incidents in the event of leakage. Therefore, how to improve the application of tantalum materials is more dependent on reducing the cost and improving the reliability of the equipment.

Due to cost and processing level restrictions, the tantalum plate is generally combined with steel in most of the chemical industry applications. At present, there are two main applications: the first is tantalum and steel clad plate structure, and the second is tantalum and steel plate tight lining structure.

The first structure is manufactured by cladding the tantalum plate with the steel plate through a transitional material (which is generally titanium, copper or nickel plate) by explosion or rolling method. Due to the close intermetallic bonding, the first structure has higher strength, thus it is the most reliable structure and especially adapted for vacuum occasions; and however, it has higher cost in cladding process, and needs cladding a thicker tantalum plate in late welding structure, which resulting in the first structure has the highest cost.

The second structure is manufactured by cladding a tantalum plate on a steel plate, and then silver brazing or flanging a periphery of the tantalum plate to fix the tantalum plate on the steel plate, wherein: when there is a through-hole, a liner tube is added and fixed with the steel plate by expansion joint, and an end portion of the liner tube is welded with the tantalum plate; when the tantalum plate is subjected to external pressure, a tantalum screw is generally preset on the steel plate in an area which has no through-hole, and then after being cladded, the tantalum plate and the steel plate are fixed by plug welding on the tantalum screw so as to withstand a certain pressure in a certain area. In the second structure, a thickness of the tantalum plate is generally no greater than 1 mm, no explosion or rolling is needed, thereby greatly reducing the cost. However, due to unstable expansion quality and pressure source of the liner tube, the expansion joint of the liner tube is failed, so that the tantalum plate bears more external pressures than the design to be deformed and failed, thus the corrosive medium enters the steel plate to cause the entire equipment to be scrapped. To avoid the above situation, at present, two sides of the steel plate, and all of the steel cylinder, the flange and the sealing surface which are connected with the steel plate are covered with the tantalum layer, which prevents the pressure source from forming a greater external pressure to the tantalum layer in contact with the corrosive medium, so that the second structure directly increases cost and processing difficulty.

SUMMARY OF THE PRESENT INVENTION

A technical problem to be solved of the present invention is to provide a loose lining structure based on a tantalum plate and a steel clad plate, which is simple in structure, reasonable in design, low in manufacturing cost and good in using effect, is able to effectively solve a problem that tantalum lining is easy to be damaged in the existing tantalum and steel plate tight lining structure, and is stable and reliable in an overall structure.

To solve the technical problems mentioned above, the present invention adopts technical solutions as follows. A loose lining structure based on a tantalum plate and a steel clad plate comprises a plate cladding base formed by the steel clad plate and the tantalum plate covered on the steel clad plate, wherein: the steel clad plate is formed by a steel layer and a cladding layer laid on the steel layer, the tantalum plate is set on the cladding layer, a periphery of the tantalum plate is fixed with the cladding layer through welding, the cladding layer is made of titanium, copper, nickel or zirconium;

a medium circulation pipe and/or a reinforcement fastening are/is set on the plate cladding base, the reinforcement fastening is a tantalum plug, the plate cladding base has a circulation pipe installing hole for installing the medium circulation pipe and/or a plug installing hole for installing the tantalum plug;

the medium circulation pipe comprises a tantalum liner tube which is installed within the circulation pipe installing hole, the tantalum liner tube and the steel clad plate are in expanding or welding connection with each other, the tantalum liner tube is fixed with the tantalum plate through welding;

the plug installing hole is a through-hole or a blind hole drilled into the steel layer from top to bottom; the tantalum plug is fixed with the tantalum plate and the cladding layer through welding.

In the above loose lining structure based on the tantalum plate and the steel clad plate, a thickness of the steel layer is in a range of 10 mm-300 mm, a thickness of the cladding layer is in a range of 2 mm-12 mm, a thickness of the tantalum plate is in a range of 0.3 mm-2 mm.

In the above loose lining structure based on the tantalum plate and the steel clad plate, the medium circulation pipe further comprises a tantalum tube coaxially sleeved within the tantalum liner tube.

The medium circulation pipe is fixed with the steel clad plate by expanding joint, and the close sealing between the medium circulation pipe and the cladding layer is by welding.

In the above loose lining structure based on the tantalum plate and the steel clad plate, the circulation pipe installing hole comprises a first lower installation hole provided in the steel clad plate and a first upper installation opening provided on the tantalum plate, the first lower installation hole is a cylindrical hole with an annular recess on a hole wall thereof, the first upper installation opening is a horn-shaped opening with gradually increasing opening size from top to bottom; an upper end of the tantalum liner tube is level with an upper end of the first upper installation opening; a bottom of the tantalum liner tube outwardly extends to below the steel clad plate; a tube section of the tantalum liner tube, which outwardly extends to below the steel clad plate, is defined as a flaring section, and a diameter of the flaring section is gradually increased from top to bottom;

the plug installation hole comprises a second lower installation hole provided in the steel clad plate and a second upper installation opening provided on the tantalum plate, the second lower installation hole is a cylindrical hole, the second upper installation opening is a horn-shaped opening with gradually increasing opening size from top to bottom.

In the above loose lining structure based on the tantalum plate and the steel clad plate, a height of the first upper installation opening is in a range of 2 mm-6 mm; an upper end of the tantalum plug is level with an upper end of the second upper installation opening, and the upper end of the tantalum plug is fixed with the upper end of the second upper installation opening through welding; a bottom of the tantalum plug is higher than a bottom of the steel clad plate; a height of the second upper installation opening is in a range of 2 mm-6 mm.

In the above loose lining structure based on the tantalum plate and the steel clad plate, an amount of the medium circulation pipe is at least one, an amount of the reinforcement fastening is at least one; the plate cladding base has a circulation pipe distribution area and/or a reinforcement connection area, the medium circulation pipe is distributed within the circulation pipe distribution area, the reinforcement fastening is distributed within the reinforcement connection area.

In the above loose lining structure based on the tantalum plate and the steel clad plate, the tantalum plug is a tube-cap-shaped or solid plug.

In the above loose lining structure based on the tantalum plate and the steel clad plate, the cladding layer has a groove for inserting the tantalum plate, a depth of the groove is smaller than a thickness of the tantalum plate, and the depth of the groove is in a range of 0.2 mm-0.5 mm.

The above loose lining structure based on the tantalum plate and the steel clad plate further comprises a leak detection tube arranged on the steel clad plate, wherein the steel clad plate has a leak detection tube installing hole for installing the leak detection tube; the leak detection tube is located at one side of the steel clad plate and is gradually inclined downwardly from inside to outside; an upper end of the leak detection tube is level with an upper surface of the cladding layer and a lower end of the leak detection tube extends outwardly to an exterior of the steel clad plate.

In the above loose lining structure based on the tantalum plate and the steel clad plate, the upper end of the leak detection tube is fixed with the cladding layer through welding; a tube section of the leak detection tube, which extends outwardly to the exterior of the steel clad plate, is defined as an outer extended section; a fixed block is sleeved on the outer extended section and fixed with the steel clad plate and the leak detection tube through welding.

In the above loose lining structure based on the tantalum plate and the steel clad plate, an outer end of the leak detection tube installing hole is provided on an outer side wall of the steel layer of the steel clad plate; the fixed block is a cladding plate which is formed by a steel plate and an outer plate located outside the steel plate; all of the outer plate, the leak detection tube and the cladding layer are made from a same material;

the steel plate of the fixed block is fixed with the steel layer of the steel clad plate through welding, and the outer plate of the fixed block is fixed with the leak detection tube through welding.

Also, the present invention discloses a manufacturing method of a loose lining structure based on a tantalum plate and a steel clad plate, which is simple in manufacturing steps, reasonable in design, easy to be realized and controlled in manufacturing process, good in using effect, and economical and practical, and the manufacturing method comprises steps of:

(S1) fixing the tantalum plate which comprises fixing the preprocessed tantalum plate on the steel clad plate, and obtaining a plate cladding base;

(S2) processing installing holes which comprises processing a circulation pipe installing hole and/or a plug installing hole in the plate cladding base obtained in the step (S1); and (S3) installing components which comprises installing a preprocessed medium circulation pipe and/or a tantalum plug, and completing a process of the loose lining structure based on the tantalum plate and the steel clad plate, wherein:

while being installed, the medium circulation pipe is fixed within the circulation pipe installing hole obtained in the step (S2); while being installed, the tantalum plug is fixed within the plug installing hole obtained in the step (S2).

In the step (S1) of the above manufacturing method, the tantalum plate is temporarily fixed on the steel clad plate by spot welding;

the medium circulation pipe is fixed with the steel clad plate by expanding joint, the close sealing between the medium circulation pipe and the cladding layer is by welding; the circulation pipe installing hole comprises a first lower installation hole provided in the steel clad plate and a first upper installation opening provided on the tantalum plate, the first lower installation hole is a cylindrical hole with an annular recess on a hole wall thereof, the first upper installation opening is a horn-shaped opening with gradually increasing opening size from top to bottom;

the plug installing hole comprises a second lower installation hole provided in the steel clad plate and a second upper installation opening provided on the tantalum plate, the second lower installation hole is a cylindrical hole, the second upper installation opening is a horn-shaped opening with gradually increasing opening size from top to bottom; an upper end of the tantalum plug is level and fixed with an upper end of the second upper installation opening through welding.

The step (S2) of processing installing holes comprises:

(S201) preliminarily processing installing holes which comprises preliminarily processing the circulation pipe installing hole and/or the plug installing hole, wherein:

while being preliminarily processed, according to a pipe diameter of the medium circulation pipe, the circulation pipe installing hole is preliminarily processed in the plate cladding base obtained in the step (S1) through a drilling tool, and then a preliminarily processed circulation pipe installing base hole, a diameter of the circulation pipe installing base hole is 6 mm-14 mm smaller than the pipe diameter of the medium circulation pipe;

while being preliminarily processed, according to a diameter of the tantalum plug, the plug installing hole is preliminarily processed in the plate cladding base obtained in the step (S1) through the drilling tool, and then a preliminarily processed plug installing base hole is obtained, a diameter of the plug installing base hole is 6 mm-14 mm smaller than the diameter of the tantalum plug;

(S202) separating the tantalum plate from the steel clad plate which comprises after completing preliminarily processing the circulation pipe installing hole and the plug installing hole, separating the tantalum plate from the steel clad plate of the plate cladding base; and (S203) performing hole-forming on the installing holes which comprises performing hole-forming on the circulation pipe installing hole and/or the plug installing hole, wherein:

while the circulation pipe installing hole is performed hole-forming, a first lower installation hole and a first upper installation opening are respectively processed, wherein while the first lower installation hole is performed hole-forming, the circulation pipe installing base hole provided in the steel clad plate is processed to a corresponding first lower installation hole; while the first upper installation opening is performed hole-forming, the circulation pipe installing base hole provided in the tantalum plate is upwardly flanged, and then a corresponding first upper installation opening is obtained;

while the plug installing hole is performed hole-forming, a second lower installation hole and a second upper installation opening are respectively processed, wherein while the second lower installation hole is performed hole-forming, the plug installing base hole provided in the steel clad plate is processed to a corresponding second lower installation hole; while the second upper installation opening is performed hole-forming, the plug installing base hole provided in the tantalum plate is upwardly flanged, and then a corresponding second upper installation opening is obtained.

In the above manufacturing method, the step (S3) of installing components comprises:

(S301) preliminarily installing which comprises installing the medium circulation pipe and/or the tantalum plug on the steel clad plate, wherein:

while the medium circulation pipe is installed, a tantalum liner tube is firstly installed within a corresponding first lower installation hole through expanding joint, and then a tube wall of the tantalum liner tube is fixed with the cladding layer through welding;

while the tantalum plug is installed, the tantalum plug is firstly installed within a corresponding second lower installation hole, and then is fixed with the cladding layer through welding;

(S302) performing alignment installation on the tantalum plate which comprises after installing the medium circulation pipe and the tantalum plug on the steel clad plate, laying the tantalum plate flat on the steel clad plate, and then respectively installing the tantalum liner tube and the tantalum plug into a corresponding first upper installation opening and a corresponding second upper installation opening;

(S303) fixing through welding which comprises fixing the tantalum liner tube and/or the tantalum plug with the tantalum plate through welding; and (S304) fixing the tantalum plate which comprises fixing a periphery of the tantalum plate with the cladding layer through welding.

In the step (S301) of the above manufacturing method, a tube section of the tantalum liner tube, which extends outwardly to below the steel clad plate, is defined as a flaring section, and a diameter of the flaring section is gradually increased from top to bottom;

In the step (S301), after the tantalum liner tube is installed within the corresponding first lower installation hole through expanding joint, a flaring process is performed on a bottom of the tantalum liner tube to obtain the flaring section.

In the step (S1) of the above manufacturing method, a leak detection tube is arranged on the steel clad plate, wherein the steel clad plate has a leak detection tube installing hole for installing the leak detection tube; the leak detection tube is located at one side of the steel clad plate and is gradually inclined downwardly from inside to outside; an upper end of the leak detection tube is level with an upper surface of the cladding layer and a lower end of the leak detection tube extends outwardly to an exterior of the steel clad plate;

in the step (S203), while the circulation pipe installing hole and the plug installing hole are performed hole-forming, the leak detection tube installing hole is processed in the steel clad plate;

in the step (S301) of preliminarily installing, the leak detection tube is also installed on the steel clad plate.

In the above manufacturing method, the upper end of the leak detection tube is fixed with the cladding layer through welding; a tube section of the leak detection tube, which extends outwardly to the exterior of the steel clad plate, is defined as an outer extended section; a fixed block is sleeved on the outer extended section and fixed with the steel clad plate and the leak detection tube through welding;

in the step (S301), while the leak detection tube is installed on the steel clad plate, the upper end of the leak detection tube is fixed with the cladding layer through welding, the fixed block is sleeved on the outer extended section of the leak detection tube and fixed with the steel clad plate and the leak detection tube through welding.

Compared with the prior art, the present invention has advantages as follows.

1. The loose lining structure provided by the present invention is simple in structure, reasonable in design and low in manufacturing cost.

2. The present invention is flexible in manufacturing method, and the medium circulation pipe and/or the reinforcement fastening are/is provided on the plate cladding base as actual requirements.

3. The medium circulation pipe is reasonable in design and convenient in processing and installing. Its installation quality is easy to be guaranteed. Moreover, it can effectively solve the problem that the liner is easy to fail due to expanding joint in the existing tantalum and steel plate tight lining structure.

4. The tantalum plug is taken as the reinforcement fastening, which is simple in structure, reasonable in design, convenient in processing and installing, good in using effect, can effectively improve the rigidity and connecting strength of the plate cladding base and solve the problem that the tantalum lining is damaged after the liner fails due to expanding joint. Moreover, an amount and locations of the reinforcement fastening can be adjusted, used flexibly and only the tantalum plug is installed on the reinforcement area.

5. The tantalum liner and the plate cladding base, adopted by the plate loose lining structure, are simple and reliable for connection. Moreover, under a coordinating action of the tantalum plug, the high pressure resistant performance of no through-hole area is effectively enhanced, thus the structure is more stable.

6. The manufacturing method is simple in manufacturing steps, reasonable in design, easy to be realized and controlled in manufacturing process, good in using effect, and economical and practical. It not only greatly reduces the manufacturing cost, but improves the reliability of the product, so that it has higher promotion and usage value.

The technical solutions of the present invention will be further described in detail below with reference to the accompanying drawings and embodiments.

Figure 1:
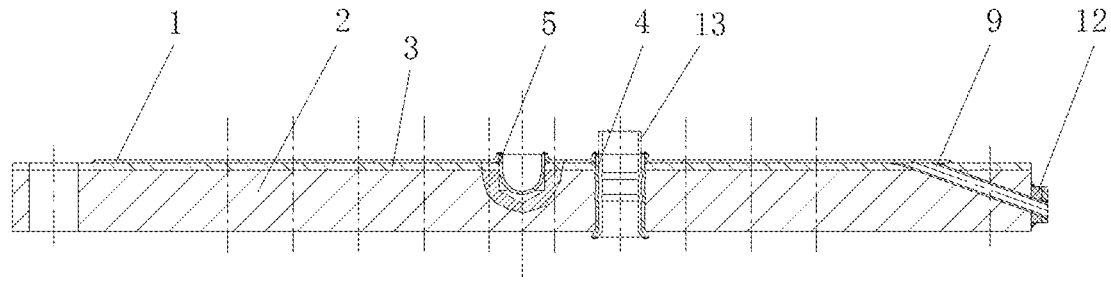
FIG. 1 is a schematic view of a loose lining structure according to a first preferred embodiment of the present invention.

In the drawings, 1: tantalum plate; 2: steel layer; 3: cladding layer; 4: tantalum liner tube; 5: tantalum plug; 6-1: first lower installation hole; 6-2: first upper installation opening; 7-1: second lower installation hole; 7-2: second upper installation opening; 8: sealing ring; 9: leak detection tube; 10: circulation pipe distribution area; 11: bolt mounting hole; 12: fixed block; 13: tantalum tube; 14: flaring section; 15: reinforcement connection area; 16: leak detection tube installing hole; 17: outer extended section; 12-1: steel plate; 12-2: outer plate; 18: groove.

DETAILED DESCRIPTION OF THE PREFERRED EMBODIMENT

Figure 2:
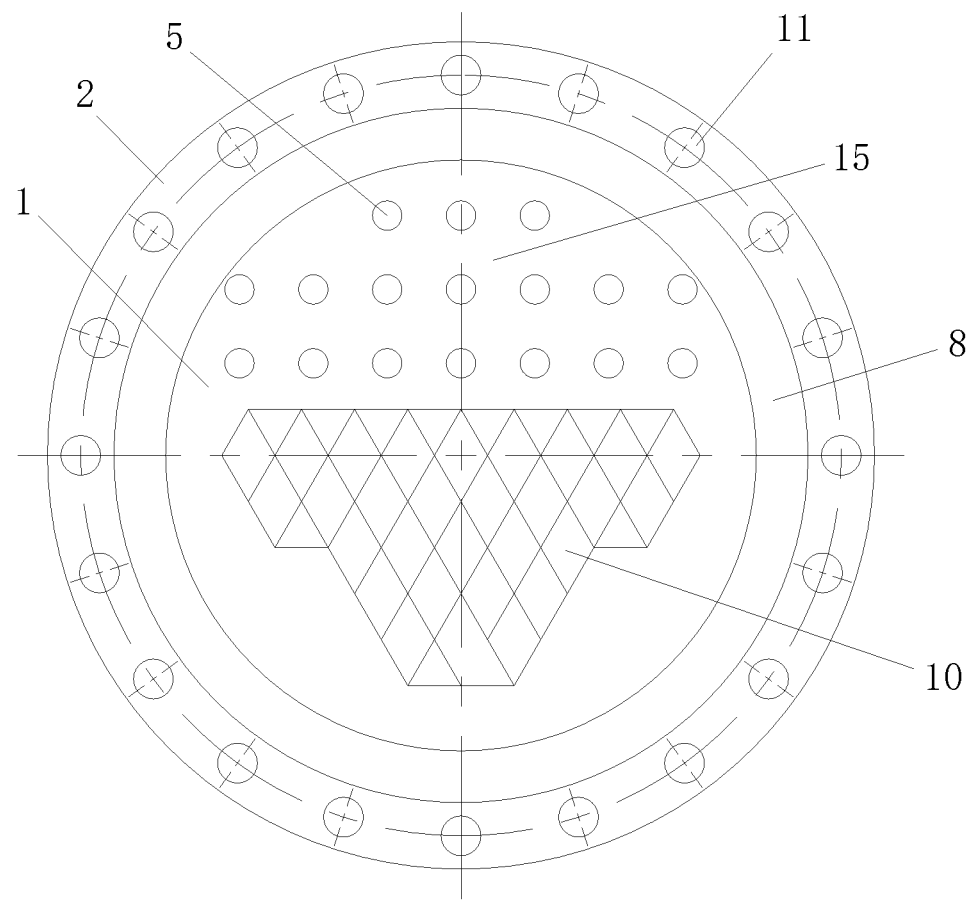
FIG. 2 is a schematic view of a medium circulation pipe, tantalum plug and leak detection tube of the loose lining structure according to the first preferred embodiment of the present invention.
Figure 3:
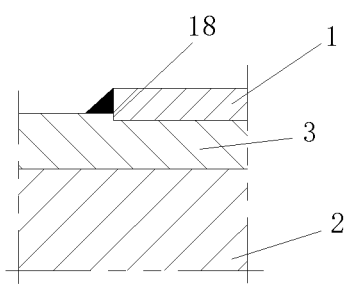
FIG. 3 is a connection status diagram of a periphery of a tantalum plate and a steel clad plate of the present invention.

First preferred embodiment:

As shown in FIGS. 1 and 2, a loose lining structure based on a tantalum plate and a steel clad plate is illustrated, which comprises a plate cladding base formed by a steel clad plate and a tantalum plate 1 covered on the steel clad plate, wherein the steel clad plate is formed by a steel layer 2 and a cladding layer 3 laid on the steel layer 2, the tantalum plate 1 is set on the cladding layer 3, a periphery of the tantalum plate 1 is fixed with the cladding layer 3 through welding, the cladding layer 3 is made of titanium, copper, nickel or zirconium;

multiple medium circulation pipes and multiple reinforcement fastenings are set on the plate cladding base, the reinforcement fastenings are tantalum plugs 5, the plate cladding base has multiple circulation pipe installing holes for installing the medium circulation pipes and multiple plug installing holes for installing the tantalum plugs 5, respectively;

each of the medium circulation pipes comprises a tantalum liner tube 4 which is installed within a corresponding circulation pipe installing hole, the tantalum liner tube 4 and the steel clad plate are in expanding and/or welding connection with each other, the tantalum liner tube 4 is fixed with the tantalum plate 1 through welding;

the plug installing holes are through-holes or blind holes drilled into the steel layer 2 from top to bottom; the tantalum plugs 5 are fixed with both the tantalum plate 1 and the cladding layer 3 through welding.

In this embodiment, the plug installing holes are the blind holes, and a bottom of the blind holes is conical.

In this embodiment, the cladding layer 3 is made of titanium.

In actual processing, an amount of the medium circulation pipe is at least one, and an amount of the reinforcement fastenings is at least one.

In this embodiment, the amount of the medium circulation pipes is larger than one.

In this embodiment, each of the medium circulation pipes further comprises a tantalum tube 13 coaxially sleeved within the corresponding tantalum liner tube 4.

In this embodiment, a thickness of the steel layer 2 is in a range of 10 mm-300 mm, and a thickness of the cladding layer 3 is in a range of 2 mm-12 mm.

In actual processing, the thickness of the steel layer 2 and the cladding layer 3 is able to be respectively adjusted according to specific requirements.

The medium circulation pipes are fixed with the steel clad plate by expanding joint, and the close sealing between each of the medium circulation pipes and the cladding layer 3 is by welding.

In this embodiment, a bottom of the tantalum liner tube 4 extends outwardly to below the steel clad plate, the tantalum liner tube 4 is fixed with the steel clad plate by expanding joint, a tube wall of the tantalum liner tube 4 is fixed with the cladding layer 3 through welding.

Figure 4:
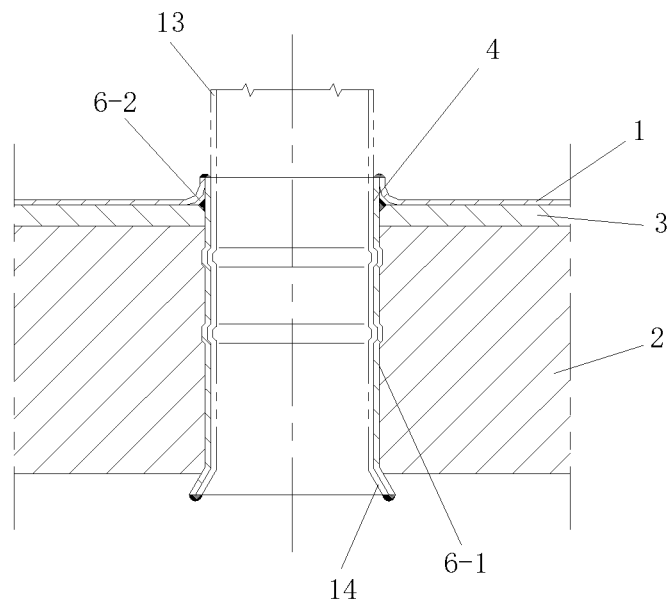
FIG. 4 is a connection status diagram of the medium circulation pipe and a plate cladding base of the present invention.

As shown in FIG. 4, each of the circulation pipe installing holes comprises a first lower installation hole 6-1 provided in the steel clad plate and a first upper installation opening 6-2 provided on the tantalum plate 1, the first lower installation hole 6-1 is a cylindrical hole with annular recesses on a hole wall thereof, the first upper installation opening 6-2 is a horn-shaped opening with gradually increasing opening size from top to bottom.

Furthermore, an amount of the annular recesses is larger than one. The multiple annular recesses are distributed along a longitudinal direction of the first lower installation hole 6-1 from top to bottom.

In this embodiment, the amount of the annular recesses is two or three.

In actual processing, the amount of the annular recesses is able to be adjusted according to specific requirements.

In this embodiment, an upper opening size of the first upper installation opening 6-2 is equal to a diameter of the first lower installation hole 6-1.

Furthermore, an upper end of the tantalum liner tube 4 is level with an upper end of the first upper installation opening 6-2. Factually, the upper end of the tantalum liner tube 4 is fixed with the upper end of the first installation opening 6-2 through welding.

To be stably installed and fixed, a tube section of the tantalum liner tube 4, which extends outwardly to below the steel clad plate, is defined as a flaring section 14, and a diameter of the flaring section 14 is gradually increased from top to bottom.

In this embodiment, a height of the first upper installation opening 6-2 is in a range of 2 mm-6 mm.

In actual processing, the height of the first upper installation opening 6-2 is able to be adjusted according to specific requirements.

Figure 5:
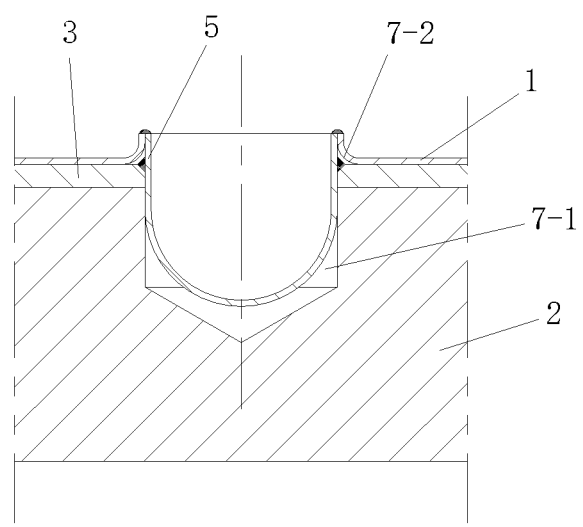
FIG. 5 is a connection status diagram of a tantalum plug and the plate cladding base of the present invention.
Figure 6:
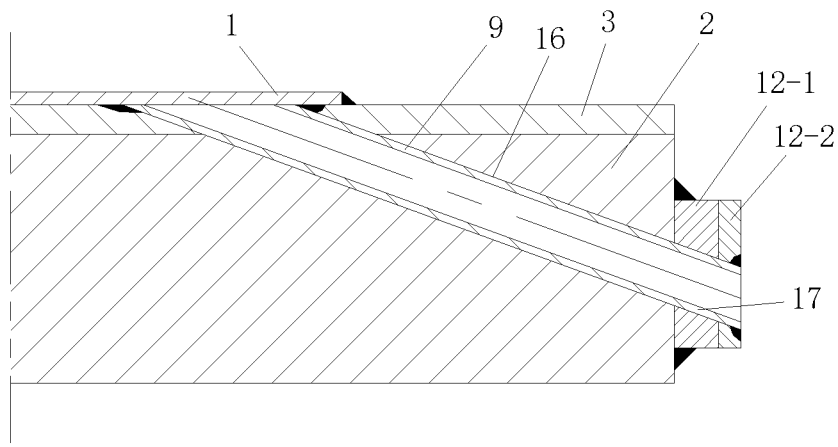
FIG. 6 is a connection status diagram of a leak detection tube and the plate cladding base of the present invention.

As shown in FIG. 5, each of the plug installing holes comprises a second lower installation hole 7-1 provided in the steel clad plate and a second upper installation opening 7-2 provided on the tantalum plate 1, the second lower installation hole 7-1 is a cylindrical hole, the second upper installation opening 7-2 is a horn-shaped opening with gradually increasing opening size from top to bottom.

In this embodiment, an upper opening size of the second upper installation opening 7-2 is equal to a diameter of the second lower installation hole 7-1.

Furthermore, an upper end of each of the tantalum plugs 5 is level with an upper end of the second upper installation opening 7-2, and the upper end of each of the tantalum plugs 5 is fixed with the upper end of the second upper installation opening 7-2 through welding.

In this embodiment, a bottom of each of the tantalum plugs 5 is higher than a bottom of the steel clad plate.

In this embodiment, a height of the second upper installation opening 7-2 is in a range of 2 mm-6 mm.

In actual processing, the height of the second upper installation opening 7-2 is able to be adjusted according to specific requirements.

In actual processing, the tantalum plugs 5 are tube-cap-shaped or solid plugs.

In this embodiment, the tantalum plugs 5 are tube-cap-shaped. Therefore, the tantalum plugs 5 are tube-cap-shaped plugs.

In actual usage, the tantalum plugs 5 are also able to be solid plugs, and specially to be round-bar-shaped plugs. To improve the fixation stability, the solid plugs are in threaded connection with the steel layer 2.

Furthermore, as shown in FIG. 5, a lower portion of each of the tantalum plugs 5 is hemispherical and an upper portion thereof is cylindrical.

In actual processing, the lower portion of each of the tantalum plugs 5 is also able to be a plane.

In this embodiment, the upper opening size of the second upper installation opening 7-2 and the diameter of the second lower installation hole 7-1 are same as an outer diameter of the upper portion of each of the tantalum plugs 5.

As shown in FIG. 2, the cladding layer 3 has a groove 18 for inserting the tantalum plate 1, and a depth of the groove 18 is smaller than a thickness of the tantalum plate 1.

In this embodiment, the depth of the groove 18 is in a range of 0.2 mm-0.5 mm.

In actual processing, the depth of the groove 18 is able to be adjusted according to specific requirements.

In this embodiment, the thickness of the tantalum plate 1 is in a range of 0.3 mm-2 mm.

In actual processing, the thickness of the tantalum plate 1 is able to be adjusted according to specific requirements.

As shown in FIG. 1, both the steel clad plate and the tantalum plate 1 are round, a diameter of the steel clad plate is larger than a diameter of the tantalum plate 1, the tantalum plate 1 is located over the steel clad plate.

Preferably, the diameter of the tantalum plate 1 is larger than an outer diameter of a sealing ring 8; the groove 18 is round and a diameter of the groove 18 is 0.2 mm-0.5 mm larger than that of the tantalum plate 1.

In actual processing, the steel clad plate is also able to be processed into other shapes, such as oval or regular polygon; the tantalum plate 1 is also able to be processed into other shapes, such as oval or regular polygon.

In this embodiment, the sealing ring 8 is located at an outer edge of the tantalum plate 1, and both the medium circulation pipe and the reinforcement fastening are located at an inner side of the sealing ring 8.

In actual processing, the tantalum plate 1 is placed within the groove 18, and the periphery of the tantalum plate 1 is fixed with the cladding layer 3 through welding.

In actual installation, when the plug installing holes are the blind holes, a gap is provided between a bottom of each of the tantalum plugs 5 and a bottom of a corresponding blind hole.

In this embodiment, the plate cladding base has a circulation pipe distribution area 10 and a reinforcement connection area 15, the medium circulation pipes are distributed within the circulation pipe distribution area 10, and the reinforcement fastenings are distributed within the reinforcement connection area 15.

An area of the plate cladding base, which is located within the inner side of the sealing ring 8, is defined as an intra-annular area, and the circulation pipe distribution area 10 and the reinforcement connection area 15 are located within the intra-annular area.

In this embodiment, an amount of both the circulation pipe distribution area 10 and the reinforcement connection area 15 is one, and the circulation pipe distribution area 10 and the reinforcement connection area 15 are respectively distributed at two sides of the plate cladding base.

In actual processing, the amount and locations of both the circulation pipe distribution area 10 and the reinforcement connection area 15 are able to be adjusted according to specific requirements.

To conveniently and stably connect, an outer edge of the steel layer 2 has multiple bolt mounting holes 11.

In this embodiment, the outer edge of the steel layer 2 along a circumferential direction thereof has the multiple bolt mounting holes 11.

In actual processing, there is also no bolt mounting hole 11 in the outer edge of the steel layer 2, and the loose lining structure based on the tantalum plate and the steel clad plate, provided by the present invention, is fixed through other connection methods, such as clamp connection.

In this embodiment, the multiple bolt mounting holes 11 are evenly distributed.

Furthermore, the multiple reinforcement fastenings are arranged in a multi-row and multi-column manner.

In actual processing, an amount and locations of the reinforcement fastenings are able to be adjusted according to specific requirements.

In this embodiment, all the reinforcement fastenings are same in structure and size, and are evenly arranged.

Simultaneously, the loose lining structure based on the tantalum plate and the steel clad plate, provided by the present invention, further comprises a leak detection tube 9 set on the steel clad plate, wherein the steel clad plate has a leak detection tube installing hole 16 for installing the leak detection tube 9; the leak detection tube 9 is located at one side of the steel clad plate and is gradually inclined downwardly from inside to outside; an upper end of the leak detection tube 9 is level with an upper surface of the cladding layer 3 and a lower end of the leak detection tube 9 extends outwardly to an exterior of the steel clad plate.

In this embodiment, the upper end of the leak detection tube 9 is fixed with the cladding layer 3 through welding; a tube section of the leak detection tube 9, which extends outwardly to the exterior of the steel clad plate, is defined as an outer extended section 17; a fixed block 12 is sleeved on the outer extended section 17 and fixed with both the steel clad plate and the leak detection tube 9 through welding.

An outer end of the leak detection tube installing hole 16 is provided on an outer side wall of the steel layer 2 of the steel clad plate.

In this embodiment, the fixed block 12 is a cladding plate which is formed by a steel plate 12-1 and an outer plate 12-2 located outside the steel plate 12-1; all of the outer plate 12-2, the leak detection tube 9 and the cladding layer 3 are made from a same material; the steel plate 12-1 of the fixed block 12 is fixed with the steel layer 2 of the steel clad plate through welding, and the outer plate 12-2 of the fixed block 12 is fixed with the leak detection tube 9 through welding.

In this embodiment, both the steel plate 12-1 and the steel layer 2 are made from a same material, and the outer plate 12-2 is made from titanium.

In this embodiment, the leak detection tube 9 is made from titanium.

In this embodiment, both a welding wire for welding the tantalum plate 1 with the cladding layer 3, and the cladding layer 3 are made of a same material, and the welding wire is made from titanium.

In actual processing, firstly, penetration testing is performed on all weld surfaces of the loose lining structure based on the tantalum plate and the steel clad plate provided by the present invention, if the penetration testing is qualified, air or helium with a certain concentration is introduced through the leak detection tube 9 for leak detection.

Figure 7:
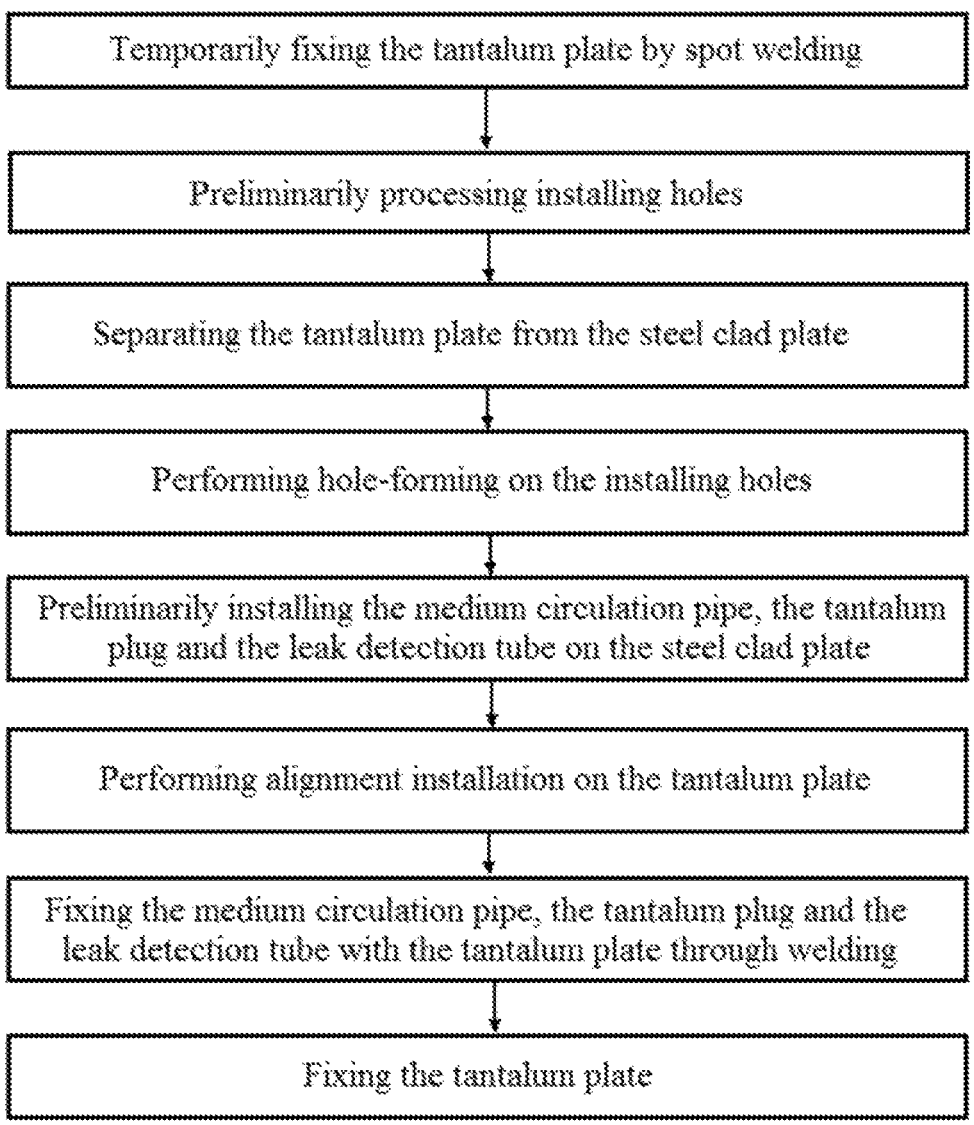
FIG. 7 is a flow chart of a manufacturing method of the loose lining structure of the present invention.

Referring to FIG. 7, a manufacturing method of a loose lining structure based on a tantalum plate and a steel clad plate is illustrated, which comprises steps of:

(S1) fixing the tantalum plate, which comprises fixing the preprocessed tantalum plate 1 on the steel clad plate, and obtaining a plate cladding base;

(S2) processing installing holes, which comprises processing multiple circulation pipe installing holes and/or multiple plug installing holes on the plate cladding base obtained in the step (S1); and (S3) installing components, which comprises installing preprocessed multiple medium circulation pipes and/or multiple tantalum plugs 5, and completing a process of the loose lining structure based on the tantalum plate and the steel clad plate, wherein:

while being installed, the medium circulation pipes are respectively fixed within the circulation pipe installing holes obtained in the step (S2); and while being installed, the tantalum plugs 5 are respectively fixed within the plug installing holes obtained in the step (S2).

In the step (S1) of this embodiment, the tantalum plate 1 is temporarily fixed on the steel clad plate by spot welding.

The step (S2) of processing installing holes comprises:

(S201) preliminarily processing the installing holes, which comprises preliminarily processing the circulation pipe installing holes and the plug installing holes, wherein:

while the circulation pipe installing holes are preliminarily processed, according to a pipe diameter of the medium circulation pipes, the circulation pipe installing holes are preliminarily processed on the plate cladding base obtained in the step (S1) through a drilling tool, and then multiple preliminarily processed circulation pipe installing base holes are obtained, a diameter of the circulation pipe installing base holes is 6 mm-14 mm smaller than the pipe diameter of the medium circulation pipes;

while the plug installing holes are preliminarily processed, according to a diameter of the tantalum plugs 5, the plug installing holes are preliminarily processed on the plate cladding base obtained in the step (S1) through the drilling tool, and then multiple preliminarily processed plug installing base holes are obtained, a diameter of the plug installing base holes is 6 mm-14 mm smaller than the diameter of the tantalum plugs 5;

(S202) separating the tantalum plate from the steel clad plate which comprises after completing preliminarily processing all the circulation pipe installing holes and the plug installing holes, separating the tantalum plate 1 from the steel clad plate of the plate cladding base; and (S203) performing hole-processing on the installing holes which comprises performing hole-processing on the circulation pipe installing holes and the plug installing holes, wherein:

while the circulation pipe installing holes are performed hole-processing, the first lower installation holes 6-1 and the first upper installation openings 6-2 are respectively processed; while the first lower installation holes 6-1 are performed hole-processing, circulation pipe installing base holes provided in the steel clad plate are processed to corresponding first lower installation holes 6-1; while the first upper installation openings 6-2 are performed hole-processing, circulation pipe installing base holes provided in the tantalum plate 1 are upwardly flanged, and then corresponding first upper installation openings 6-2 are obtained;

while the plug installing holes are performed hole-processing, the second lower installation holes 7-1 and the second upper installation openings 7-2 are respectively processed; while the second lower installation holes 7-1 are performed hole-processing, plug installing base holes provided in the steel clad plate are processed to the corresponding second lower installation holes 7-1; while the second upper installation openings 7-2 are performed hole-processing, plug installing base holes provided in the tantalum plate 1 is upwardly flanged, and then corresponding second upper installation openings 7-2 are obtained.

Both the circulation pipe installing base holes and the plug installing base holes are cylindrical. Further, while the first lower installation holes 6-1 are performed hole-processing, each of the first lower installation holes 6-1 has annular recesses on a hole wall thereof.

Moreover, when the tantalum plate 1 is temporarily fixed on the steel clad plate by spot welding in the step (S1), the tantalum plate 1 is firstly placed within the groove 18 of the steel clad plate, and then is fixed via 4-8 spots around the tantalum plate 1 through spot welding.

In the step (S203) of this embodiment, after being upwardly flanged, the circulation pipe installing base holes provided in the tantalum plate 1 perform deburring; also, after being upwardly flanged, the plug installing base holes provided in the tantalum plate 1 perform deburring.

In this embodiment, the step (S3) of installing components comprises:

(S301) preliminarily installing which comprises installing the medium circulation pipes and/or the tantalum plugs 5 on the steel clad plate, wherein:

while being installed, the tantalum liner tubes 4 are respectively firstly installed within the first lower installation holes 6-1 through expanding joint, and then a tube wall of the tantalum liner tubes 4 is fixed with the cladding layer 3 through welding;

while being installed, the tantalum plugs 5 are respectively firstly installed within the second lower installation holes 7-1, and then are fixed with the cladding layer 3 through welding;

(S302) performing alignment installation on the tantalum plate which comprises after installing all the medium circulation pipes and the tantalum plugs 5 on the steel clad plate, laying the tantalum plate 1 flat on the steel clad plate, and then respectively installing every tantalum liner tube 4 and every tantalum plug 5 into a corresponding first upper installation opening 6-2 and a corresponding second upper installation opening 7-2;

(S303) fixing through welding which comprises fixing the tantalum liner tubes 4 and the tantalum plugs 5 with the tantalum plate 1 through welding; and (S304) fixing the tantalum plate which comprises fixing a periphery of the tantalum plate 1 with the cladding layer 3 through welding.

In the step (S301) of this embodiment, a tube section of every tantalum liner tube 4, which extends outwardly to below the steel clad plate, is defined as a flaring section 14, and a diameter of the flaring section 14 is gradually increased from top to bottom.

In the step (S301), after every tantalum liner tube 4 is installed within the corresponding first lower installation hole 6-1 through expanding joint, a bottom of the tantalum liner tube 4 is carried out flaring to obtain the flaring section 14.

In the step (S301) of this embodiment, while being preliminarily installed, all the medium circulation pipes (which are embodies as the tantalum liner tubes 4) are firstly respectively installed within the first lower installation holes 6-1, and then the cladding layer 3 is respectively fixed with the tantalum liner tubes 4 and the tantalum plugs 5 through welding.

In the step (S3) of this embodiment, the tantalum liner tubes 4, the tantalum plugs 5, the steel clad plate and the tantalum plate 1 are respectively cleaned before the medium circulation pipes and the tantalum plugs are installed, which is embodied as being cleaned through a conventional acid pickling method to remove surface stains.

In the step (S1) of this embodiment, a leak detection tube 9 is set on the steel clad plate, wherein the steel clad plate has a leak detection tube installing hole 16 for installing the leak detection tube 9; the leak detection tube 9 is located at one side of the steel clad plate and is gradually inclined downwardly from inside to outside; an upper end of the leak detection tube 9 is level with an upper surface of the cladding layer 3 and a lower end of the leak detection tube 9 extends outwardly to an exterior of the steel clad plate.

In the step (S203), while the circulation pipe installing holes are performed hole-processing, the leak detection tube installing hole 16 is processed in the steel clad plate.

In the step (S301) of preliminarily installing, the leak detection tube 9 is also installed on the steel clad plate.

In this embodiment, the upper end of the leak detection tube 9 is fixed with the cladding layer 3 through welding; a tube section of the leak detection tube 9, which extends outwardly to the exterior of the steel clad plate, is defined as an outer extended section 17; a fixed block 12 is sleeved on the outer extended section 17 and fixed with the steel clad plate and the leak detection tube 9 through welding.

In the step (S301), while being installed on the steel clad plate, the upper end of the leak detection tube 9 is fixed with the cladding layer 3 through welding, the fixed block 12 is sleeved on the outer extended section 17 of the leak detection tube 9 and fixed with the steel clad plate and the leak detection tube 9 through welding.

In this embodiment, before being installed, the leak detection tube 9 is cleaned, which is further embodied as being cleaned through a conventional acid pickling method to remove surface stains.

Figure 8:
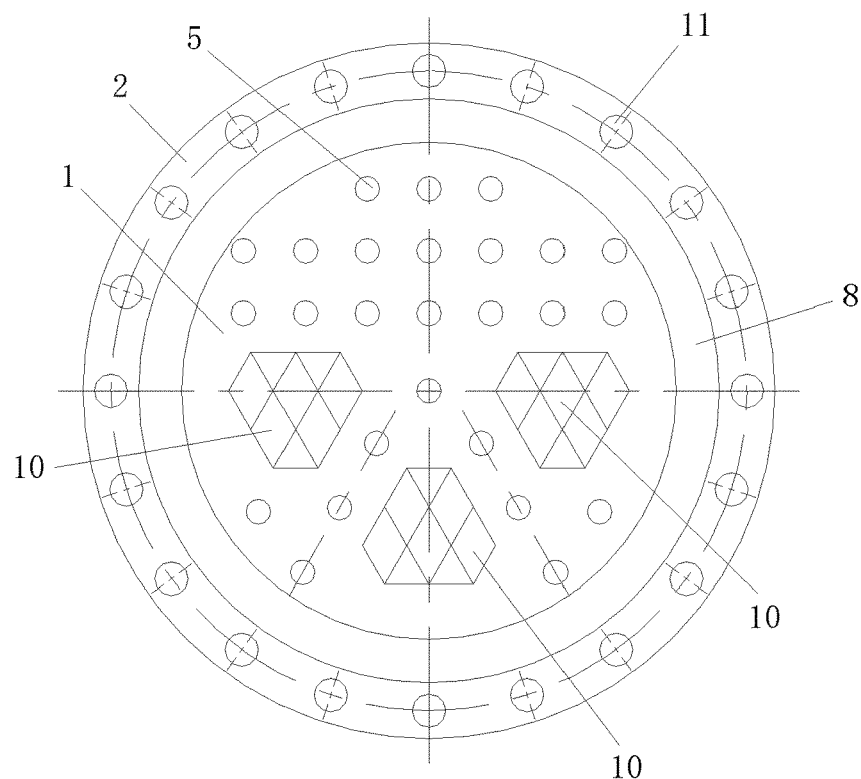
FIG. 8 is a schematic view of a loose lining structure according to a second preferred embodiment of the present invention.

Second preferred embodiment:

As shown in FIG. 8, a loose lining structure based on a tantalum plate and a steel clad plate according to a second preferred embodiment of the present invention is illustrated, which is different from the loose lining structure according to the first preferred embodiment as follows. An amount of the reinforcement connection areas 15 is three, the three reinforcement connection areas 15 are evenly distributed at a same side of the plate cladding base and are respectively distributed at three vertices of an equilateral triangle.

In actual processing, the amount and locations of both the circulation pipe distribution areas 10 and the reinforcement connection areas 15 are able to be adjusted according to specific requirements.

Other structures and connection relationships of the loose lining structure based on the tantalum plate and the steel clad plate according to the second preferred embodiment and those of the loose lining structure according to the first preferred embodiment are the same.

A manufacturing method of the loose lining structure based on the tantalum plate and the steel clad plate according to the second preferred embodiment and that of the loose lining structure according to the first preferred embodiment is the same.

Figure 9:
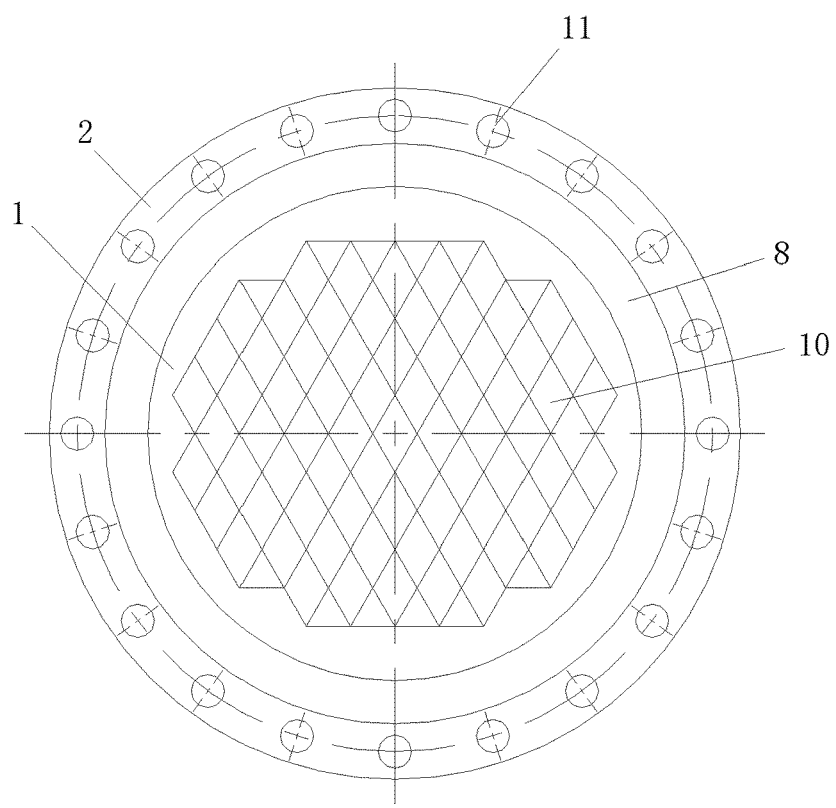
FIG. 9 is a schematic view of a loose lining structure according to a third preferred embodiment of the present invention.

Third preferred embodiment:

As shown in FIG. 9, a loose lining structure based on a tantalum plate and a steel clad plate according to a third preferred embodiment of the present invention is illustrated, which is different from the loose lining structure according to the first preferred embodiment as follows. Only the reinforcement fastenings are provided on the plate cladding base, and no medium circulation pipe is provided, so that only reinforcement connection areas 15 are provided on the plate cladding base.

Other structures and connection relationships of the loose lining structure based on the tantalum plate and the steel clad plate according to the third preferred embodiment and those of the loose lining structure according to the first preferred embodiment are the same.

A manufacturing method of the loose lining structure based on the tantalum plate and the steel clad plate according to the third preferred embodiment is different that of the loose lining structure according to the first preferred embodiment as follows. In the step (S2) of processing installing holes, only the drilling tool is adopted to process the plug installing holes on the plate cladding base obtained in the step (S1); in the step (S3) of installing components, only the preformed tantalum plugs 5 need to been installed.

Other steps of the manufacturing method of the loose lining structure based on the tantalum plate and the steel clad plate according to the third preferred embodiment and those of the loose lining structure according to the first preferred embodiment are the same.

Figure 10:
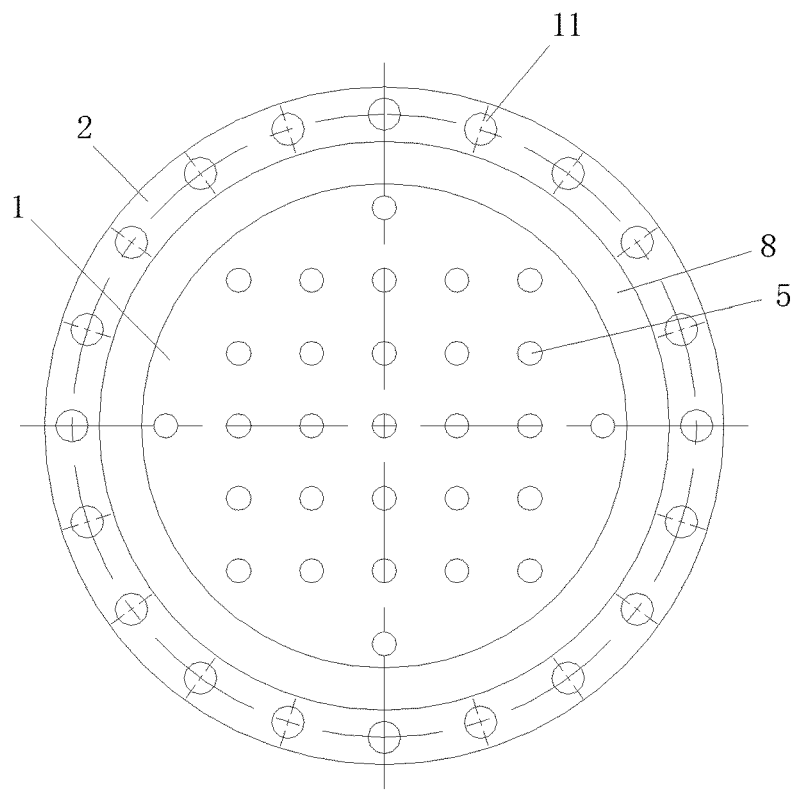
FIG. 10 is a schematic view of a loose lining structure according to a fourth preferred embodiment of the present invention.

Fourth preferred embodiment:

As shown in FIG. 10, a loose lining structure based on a tantalum plate and a steel clad plate according to a fourth preferred embodiment of the present invention is illustrated, which is different from the loose lining structure according to the first preferred embodiment as follows. Only the medium circulation pipes are provided on the plate cladding base, and no reinforcement fastening is provided, so that only circulation pipe distribution areas 10 are provided on the plate cladding base.

Other structures and connection relationships of the loose lining structure based on the tantalum plate and the steel clad plate according to the fourth preferred embodiment and those of the loose lining structure according to the first preferred embodiment are the same.

A manufacturing method of the loose lining structure based on the tantalum plate and the steel clad plate according to the fourth preferred embodiment is different that of the loose lining structure according to the first preferred embodiment as follows. In the step (S2) of processing installing holes, only the drilling tool is adopted to process the circulation pipe installing holes on the plate cladding base obtained in the step (S1); in the step (S3) of installing components, only the preprocessed medium circulation pipes need to been installed.

Other steps of the manufacturing method of the loose lining structure based on the tantalum plate and the steel clad plate according to the fourth preferred embodiment and those of the loose lining structure according to the first preferred embodiment are the same.

Figure 11:
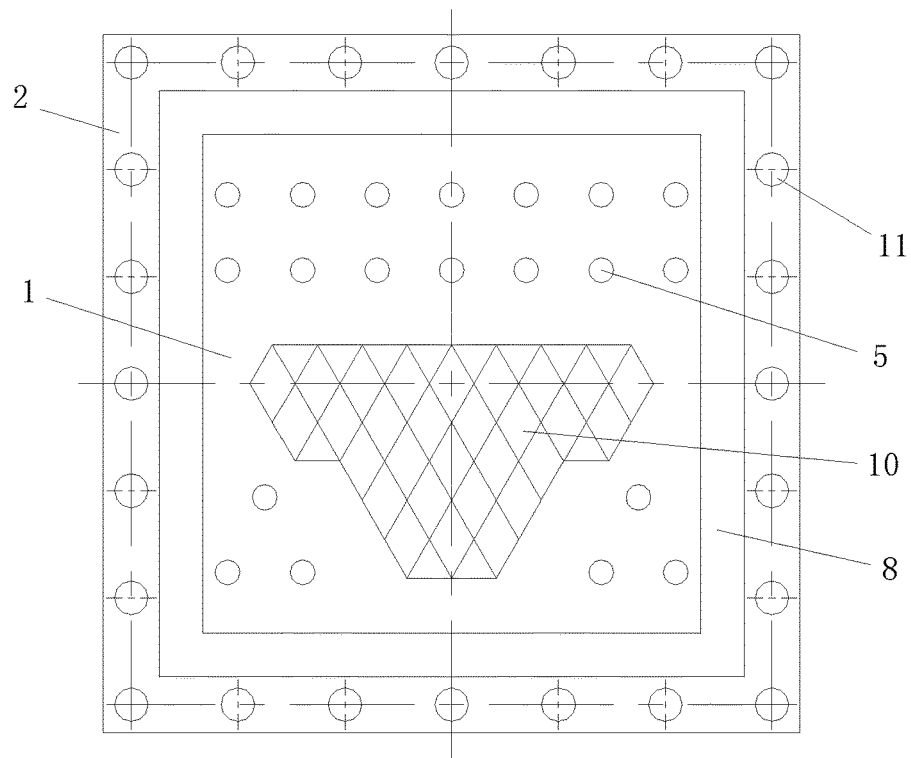
FIG. 11 is a schematic view of a loose lining structure according to a fifth preferred embodiment of the present invention.

Fifth preferred embodiment:

As shown in FIG. 11, a loose lining structure based on a tantalum plate and a steel clad plate according to a fifth preferred embodiment of the present invention is illustrated, which is different from the loose lining structure according to the first preferred embodiment as follows. Both the steel clad plate and the tantalum plate is a square, a length of a side of the steel clad plate is larger than that of the tantalum plate 1, the tantalum plate 1 is located over the steel clad plate, four outer edges of the steel layer 2 respectively have multiple bolt mounting holes 11 along a same line.

Other structures and connection relationships of the loose lining structure based on the tantalum plate and the steel clad plate according to the fifth preferred embodiment and those of the loose lining structure according to the first preferred embodiment are the same.

A manufacturing method of the loose lining structure based on the tantalum plate and the steel clad plate according to the fifth preferred embodiment and that of the loose lining structure according to the first preferred embodiment is the same.

The above descriptions are only the preferred embodiments of the present invention and are not intended to limit the present invention, and any simple modifications, variations, and equivalent structural changes to the above embodiments in accordance with the teachings of the present invention are still within the protective scope of the present invention.

What is claimed is:

1. A loose lining structure comprising a plate cladding base formed by a steel clad plate and a tantalum plate covered on the steel clad plate, wherein:

the steel clad plate is formed by a steel layer and a cladding layer laid on the steel layer, the tantalum plate is arranged on the cladding layer, a periphery of the tantalum plate is fixed with the cladding layer through welding, the cladding layer is made of titanium, copper, nickel or zirconium;

a medium circulation pipe and/or a reinforcement fastening are/is set on the plate cladding base, the reinforcement fastening is a tantalum plug, the plate cladding base has a circulation pipe installing hole for installing the medium circulation pipe and/or a plug installing hole for installing the tantalum plug;

the medium circulation pipe comprises a tantalum liner tube which is installed within the circulation pipe installing hole, the tantalum liner tube and the steel clad plate are in expanding or welding connection with each other, the liner tube is fixed with the tantalum plate through welding;

the plug installing hole is a through-hole or a blind hole drilled into the steel layer from top to bottom; the tantalum plug is fixed with the tantalum plate and the cladding layer through welding;

the medium circulation pipe further comprises a tantalum tube coaxially sleeved within the tantalum liner tube; the medium circulation pipe is fixed with the steel clad plate by expanding joint, and a close sealing between the medium circulation pipe and the cladding layer is by welding;

the circulation pipe installing hole comprises a first lower installation hole provided in the steel clad plate and a first upper installation opening provided on the tantalum plate, the first lower installation hole is a cylindrical hole with an annular recess on a hole wall thereof, the first upper installation opening has a gradually increasing opening size from top to bottom; an upper end of the tantalum liner tube is level with an upper end of the first upper installation opening; a bottom of the tantalum liner tube outwardly extends to below the steel clad plate; a tube section of the tantalum liner tube, which outwardly extends to below the steel clad plate, is defined as a flaring section, and a diameter of the flaring section is gradually increased from top to bottom;

the plug installing hole comprises a second lower installation hole provided in the steel clad plate and a second upper installation opening provided on the tantalum plate, the second lower installation hole is a cylindrical hole, the second upper installation opening has a gradually increasing opening size from top to bottom.

2. The loose lining structure, as recited in claim 1, wherein: a height of the first upper installation opening is in a range of 2 mm-6 mm; an upper end of the tantalum plug is level with an upper end of the second upper installation opening, and the upper end of the tantalum plug is fixed with the upper end of the second upper installation opening through welding; a bottom of the tantalum plug is higher than a bottom of the steel clad plate; a height of the second upper installation opening is in a range of 2 mm-6 mm.

3. The loose lining structure, as recited in claim 1, wherein: the number of the medium circulation pipe is at least one, the number of the reinforcement fastening is at least one; plate cladding base has a circulation pipe distribution area and/or a reinforcement connection area, the medium circulation pipe is distributed within the circulation pipe distribution area, the reinforcement fastening is distributed within the reinforcement connection area.

4. The loose lining structure, as recited in claim 1, wherein: the tantalum plug is a tube-cap-shaped or solid plug.

5. The loose lining structure, as recited in claim 1, wherein: the cladding layer has a groove for inserting the tantalum plate, a depth of the groove is smaller than a thickness of the tantalum plate, and the depth of the groove is in a range of 0.2 mm-0.5 mm.

6. A loose lining structure comprising a plate cladding base formed by a steel clad plate and a tantalum plate covered on the steel clad plate, wherein:
the steel clad plate is formed by a steel layer and a cladding layer laid on the steel layer, the tantalum plate is arranged on the cladding layer, a periphery of the tantalum plate is fixed with the cladding layer through welding, the cladding layer is made of titanium, copper, nickel or zirconium;
a medium circulation pipe and/or a reinforcement fastening are/is set on the plate cladding base, the reinforcement fastening is a tantalum plug, the plate cladding base has a circulation pipe installing hole for installing the medium circulation pipe and/or a plug installing hole for installing the tantalum plug;
the medium circulation pipe comprises a tantalum liner tube which is installed within the circulation pipe installing hole, the tantalum liner tube and the steel clad plate are in expanding or welding connection with each other, the liner tube is fixed with the tantalum plate through welding;
the plug installing hole is a through-hole or a blind hole drilled into the steel layer from top to bottom; the tantalum plug is fixed with the tantalum plate and the cladding layer through welding;
the loose lining structure further comprises a leak detection tube arranged on the steel clad plate, wherein: the steel clad plate has a leak detection tube installing hole for installing the leak detection tube; the leak detection tube is located at one side of the steel clad plate and is gradually inclined downwardly from inside to outside; an upper end of the leak detection tube is level with an upper surface of the cladding layer and a lower end of the leak detection tube extends outwardly to an exterior of the steel clad plate.

7. The loose lining structure, as recited in claim 6, wherein: the upper end of the leak detection tube is fixed with the cladding layer through welding; a tube section of the leak detection tube, which extends outwardly to the exterior of the steel clad plate, is defined as an outer extended section; a fixed block is sleeved on the outer extended section and fixed with the steel clad plate and the leak detection tube through welding.

8. The loose lining structure, as recited in claim 7, wherein:
an outer end of the leak detection tube installing hole is provided on an outer side wall of the steel layer of the steel clad plate; the fixed block is a cladding plate which is formed by a steel plate and an outer plate located outside the steel plate; all of the outer plate, the leak detection tube and the cladding layer are made from a same material;
the steel plate of the fixed block is fixed with the steel layer of the steel clad plate through welding, and the outer plate of the fixed block is fixed with the leak detection tube through welding.

9. A manufacturing method of a loose lining structure, comprising steps of:
(S1) fixing a tantalum plate which comprises fixing the preprocessed tantalum plate on a steel clad plate, and obtaining a plate cladding base;
(S2) processing installing holes which comprises processing a circulation pipe installing hole and/or a plug installing hole in the plate cladding base obtained in the step (S1); and
(S3) installing components which comprises installing a preprocessed medium circulation pipe and/or a tantalum plug, and completing a process of the loose lining structure, wherein:
while being installed, the medium circulation pipe is fixed within the circulation pipe installing hole in the step (S2); while being installed, the tantalum plug is fixed within the plug installing hole in the step (S2);
in the step (S1) of fixing the tantalum plate, the tantalum plate is temporarily fixed on the steel clad plate by spot welding;
the medium circulation pipe is fixed with the steel clad plate by expanding joint, a close sealing between the medium circulation pipe and the cladding layer is by welding; the circulation pipe installing hole comprises a first lower installation hole provided in the steel clad plate and a first upper installation opening provided on the tantalum plate, the first lower installation hole is a cylindrical hole with an annular recess on a hole wall thereof, the first upper installation opening has a gradually increasing opening size from top to bottom;
the plug installing hole comprises a second lower installation hole provided on the steel clad plate and a second upper installation opening provided on the tantalum plate, the second lower installation hole is a cylindrical hole, the second upper installation opening has a gradually increasing opening size from top to bottom; an upper end of the tantalum plug is level and fixed with an upper end of the second upper installation opening through welding;
the step (S2) of processing installing holes comprises:
(S201) preliminarily processing installing holes which comprises preliminarily processing the circulation pipe installing hole and/or the plug installing hole, wherein:
while being preliminarily processed, according to a pipe diameter of the medium circulation pipe, the circulation pipe installing hole is preliminarily processed in the plate cladding base obtained in the step (S1) through a drilling tool, and then a preliminarily processed circulation pipe installing base hole, a diameter of the circulation pipe installing base hole is 6 mm-14 mm smaller than the pipe diameter of the medium circulation pipe;

while being preliminarily processed, according to a diameter of the tantalum plug, the plug installing hole is preliminarily processed in the plate cladding base obtained in the step (S1) through the drilling tool, and then a preliminarily processed plug installing base hole is obtained, a diameter of the plug installing base hole is 6 mm-14 mm smaller than the diameter of the tantalum plug;

(S202) separating the tantalum plate from the steel clad plate which comprises after completing preliminarily processing the circulation pipe installing hole and the plug installing hole, separating the tantalum plate from the steel clad plate of the plate cladding base; and (S203) performing hole-forming on the installing holes which comprises performing hole-forming on the circulation pipe installing hole and/or the plug installing hole, wherein:

while the circulation pipe installing hole is performed hole-forming, the first lower installation hole and the first upper installation opening are respectively processed, wherein while the first lower installation hole is performed hole-forming, the circulation pipe installing base hole provided in the steel clad plate is processed to a corresponding first lower installation hole; while the first upper installation opening is performed hole-forming, the circulation pipe installing base hole provided in the tantalum plate is upwardly flanged, and then a corresponding first upper installation opening is obtained;

while the plug installing hole is performed hole-forming, a second lower installation hole and a second upper installation opening are respectively processed, wherein while the second lower installation hole is performed hole-forming, the plug installing base hole provided in the steel clad plate is processed to a corresponding second lower installation hole; while the second upper installation opening is performed hole-forming, the plug installing base hole provided in the tantalum plate is upwardly flanged, and then a corresponding second upper installation opening is obtained.

10. The manufacturing method, as recited in claim 9, wherein: the step (S3) of installing components comprises:

(S301) preliminarily installing which comprises installing the medium circulation pipe and/or the tantalum plug on the steel clad plate, wherein:

while the medium circulation pipe is installed, a tantalum liner tube is firstly installed within a corresponding first lower installation hole through expanding joint, and then a tube wall of the tantalum liner tube is fixed with the cladding layer through welding;

while the tantalum plug is installed, the tantalum plug is firstly installed within a corresponding second lower installation hole, and then is fixed with the cladding layer through welding;

(S302) performing alignment installation on the tantalum plate which comprises after installing the medium circulation pipe and the tantalum plug on the steel clad plate, laying the tantalum plate flat on the steel clad plate, and then respectively installing the tantalum liner tube and the tantalum plug into a corresponding first upper installation opening and a corresponding second upper installation opening;

(S303) fixing through welding which comprises fixing the tantalum liner tube and/or the tantalum plug with the tantalum plate through welding; and (S304) fixing the tantalum plate which comprises fixing a periphery of the tantalum plate with the cladding layer through welding.

11. The manufacturing method, as recited in claim 10, wherein:

in the step (S301), a tube section of the tantalum liner tube, which extends outwardly to below the steel clad plate, is defined as a flaring section, and a diameter of the flaring section is gradually increased from top to bottom;

in the step (S301), after the tantalum liner tube is installed within the corresponding first lower installation hole through expanding joint, the flaring section is obtained by performing a flaring process on a bottom of the tantalum liner tube.

12. The manufacturing method, as recited in claim 10, wherein:

in the step (S1), a leak detection tube is arranged on the steel clad plate, wherein the steel clad plate has a leak detection tube installing hole for installing the leak detection tube; the leak detection tube is located at one side of the steel clad plate and is gradually inclined downwardly from inside to outside; an upper end of the leak detection tube is level with an upper surface of the cladding layer and a lower end of the leak detection tube extends outwardly to an exterior of the steel clad plate;

in the step (S203), while the circulation pipe installing hole and the plug installing hole are performed hole-forming, the leak detection tube installing hole is processed in the steel clad plate;

in the step (S301) of preliminarily installing, the leak detection tube is installed on the steel clad plate.

13. The manufacturing method, as recited in claim 12, wherein:

the upper end of the leak detection tube is fixed with the cladding layer through welding; a tube section of the leak detection tube, which extends outwardly to the exterior of the steel clad plate, is defined as an outer extended section; a fixed block is sleeved on the outer extended section and fixed with the steel clad plate and the leak detection tube through welding;

in the step (S301), while the leak detection tube is installed on the steel clad plate, the upper end of the leak detection tube is fixed with the cladding layer through welding, the fixed block is sleeved on the outer extended section of the leak detection tube and fixed with the steel clad plate and the leak detection tube through welding.

* * * * *